(12) United States Patent
Gao (10) Patent No.: US 10,027,502 B2
(45) Date of Patent: Jul. 17, 2018

(54) INFORMATION PROCESSING METHOD AND ELECTRONIC DEVICE (71) Applicants: Beijing Lenovo Software Ltd., Haidian District, Beijing (CN); Lenovo (Beijing) Co., Ltd., Haidian District, Beijing (CN)

(72) Inventor: Changlei Gao, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 269 days.

(21) Appl. No.: 14/867,572

(22) Filed: Sep. 28, 2015

(65) Prior Publication Data
US 2017/0005822 A1 Jan. 5, 2017

(30) Foreign Application Priority Data
Jun. 30, 2015 (CN) .......................... 2015 1 0379520

(51) Int. Cl.
*G06F 15/16* (2006.01)
*H04L 12/28* (2006.01)

(52) U.S. Cl.
CPC ...... *H04L 12/2814* (2013.01); *H04L 12/2809* (2013.01); *H04L 12/2825* (2013.01); *H04L 12/2829* (2013.01)

(58) Field of Classification Search
CPC ............. H04L 12/2814; H04L 12/2809; H04L 12/2825; H04L 12/2829; Y02P 90/02
See application file for complete search history.

(56) References Cited

U.S. PATENT DOCUMENTS

| | | | | |
|---|---|---|---|---|
| 7,096,164 | B1* | 8/2006 | Musharbash | G06F 17/50 703/1 |
| 7,216,088 | B1* | 5/2007 | Chappel | G06Q 10/063118 705/7.17 |
| 7,236,940 | B2* | 6/2007 | Chappel | G06Q 10/10 705/7.31 |

(Continued)

FOREIGN PATENT DOCUMENTS

CN 104486416 A 4/2015

OTHER PUBLICATIONS

Office Action, and English language translation thereof, in corresponding Chinese Application No. 201510379520.2, dated Apr. 26, 2017, 21 pages.

*Primary Examiner* — Moustafa M Meky
*Assistant Examiner* — Andrea Hurst
(74) *Attorney, Agent, or Firm* — Brinks Gilson & Lione; John C. Freeman (57) ABSTRACT

An information processing method and an electronic device are described where the method includes receiving and storing a first set of rule information, the first set of rule information including one piece or more pieces of first rule information, each piece of first rule information indicating a specific rule that a first control device triggers a second sub-device to perform a predetermined operation in response to detection of a predetermined condition of a first sub-device; extracting second rule information from each piece of first rule information to generate a second set of rule information; and transmitting the second set of rule information to the second control device.

18 Claims, 5 Drawing Sheets

(56) References Cited

U.S. PATENT DOCUMENTS

| | | | | |
|---|---|---|---|---|
| 7,313,531 | B2* | 12/2007 | Chappel | G06Q 10/06 |
| | | | | 705/7.17 |
| 7,386,526 | B1* | 6/2008 | Chappel | G06Q 10/10 |
| | | | | 706/47 |
| 7,822,621 | B1* | 10/2010 | Chappel | G06Q 10/087 |
| | | | | 704/9 |
| 7,831,442 | B1* | 11/2010 | Chappel | G06Q 10/087 |
| | | | | 705/2 |
| 8,166,019 | B1* | 4/2012 | Lee | G06Q 10/02 |
| | | | | 705/5 |
| 8,392,422 | B2* | 3/2013 | Redfern | G06F 17/30616 |
| | | | | 707/741 |
| 8,423,577 | B1* | 4/2013 | Lee | G06Q 10/02 |
| | | | | 705/5 |
| 8,521,479 | B2* | 8/2013 | Musharbash | G06F 17/50 |
| | | | | 703/1 |
| 9,098,360 | B2* | 8/2015 | Mineno | G06F 9/542 |
| 9,424,521 | B2* | 8/2016 | Bloomquist | G06N 5/02 |
| 9,488,481 | B2* | 11/2016 | Javed | G01C 21/206 |
| 9,642,209 | B2* | 5/2017 | Eisele | H05B 33/0869 |
| 9,715,242 | B2* | 7/2017 | Pillai | G05D 27/02 |

* cited by examiner

INFORMATION PROCESSING METHOD AND ELECTRONIC DEVICE

This application claims priority to Chinese patent application No. 201510379520.2 filed Jun. 30, 2015, the entire contents of which are incorporated herein by reference.

The present disclosure relates to an information processing method and an electronic device.

BACKGROUND

At present, smart home is becoming increasingly popular. Typically, some rules are set by a user at home, such as automatic door light switching, timely water drinking reminder and water heating control of a water fountain, safety reminder of a smoke detector, these linkage requirements are not confined to one's own home, if they can be automatically ubiquitously adapted to workplace, parents' home, hotels, etc., then the user will be able to experience all-day, all-dimension personalized linkage, not only user experience is enhanced, but also application scenario of control devices such as smart hub is expanded.

For this reason, it is desirable to provide an information processing method and an electronic device, which enable the user to apply set rules to different control devices, thereby improving user experience.

SUMMARY

According to an embodiment of the present disclosure, there is provided an information processing method applied to an electronic device, the method comprising:

receiving and storing a first set of rule information, the first set of rule information including one piece or more pieces of first rule information, each piece of first rule information indicating a specific rule that a first control device triggers a second sub-device to perform a predetermined operation in response to detection of a predetermined condition of a first sub-device;

extracting second rule information from each piece of first rule information to generate a second set of rule information, each piece of second rule information indicating an abstract rule that a second control device triggers a second type of sub-devices having the same one or more attributes as the second sub-device to perform a predetermined operation in response to detection of a predetermined condition of a first type of sub-devices having the same one or more attributes as the first sub-device; and transmitting the second set of rule information to the second control device.

According to another embodiment of the present disclosure, there is provided an electronic device, comprising:

a receiver configured to receive a first set of rule information, the first set of rule information including one piece or more pieces of first rule information, each piece of first rule information indicating a specific rule that a first control device triggers a second sub-device to perform a predetermined operation in response to detection of a predetermined condition of a first sub-device;

a storage configured to store a first set of rule information;

a processor configured to extract second rule information from each piece of first rule information to generate a second set of rule information, each piece of second rule information indicating an abstract rule that a second control device triggers a second type of sub-devices having the same one or more attributes as the second sub-device to perform a predetermined operation in response to detection of a predetermined condition of a first type of sub-devices having the same one or more attributes as the first sub-device; and a transmitter configured to transmit the second set of rule information to the second control device.

DETAILED DESCRIPTION

Hereinafter, the information processing method and the electronic device according to the embodiments of the present disclosure will be described in detail with reference to the accompanying drawings.

The information processing method according to an embodiment of the present disclosure is applied to an electronic device, such as a cloud server. Of course, the electronic device is not limited to the cloud server, for example, it may also be a home computing device which is capable of controlling respective smart sub-devices in the entire home.

In an existing smart network, various device linkage rules set by the user (such as a device A triggers a device B) are based on a central control device (such as a hub). For example, as for a home smart network, the user can set triggering a bedside lamp to turn on via a home hub when a door magnetism detects that a bedroom door is opened.

When the user comes to workplace or a hotel, such linkage rules do not apply, the user will not be able to experience all-day, all-dimension personalized linkage.

The present disclosure is provided in view of the above situation. The information processing method according to a first embodiment of the present disclosure can adapt various specific linkage rules (a device A triggers a device B) applied on a first control device (such as a hub) at a location A to a second control device (such as hub) at a different location B, so as to perform similar linkage rules under the control of the second control device (a device A' triggers a device B'), thus allowing the user to experience all-day, all-dimension personalized linkage in different locations under different circumstances.

Figure 1:
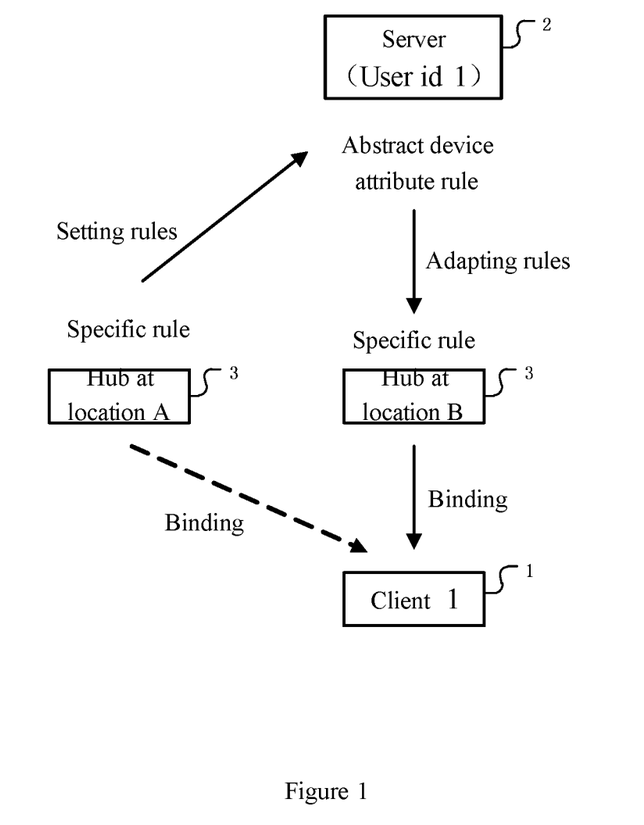
FIG. 1 is a schematic diagram of an information processing method according to a first embodiment of present disclosure.

Specifically, a smart network as shown in FIG. 1 includes a client device 1, a hub 3 at a location A, a hub 3 at a location B, a server 2, sub-devices at the location A (a device A and a device B, not shown) and sub-devices at the location B (a device A' and a device B'). The device A, the device B, the device A' and the device B' may be any devices. In this embodiment, explanation is provided with the device A and the device A' are a door magnetism, and the device B and the device B' are a lamp as an example.

In this smart network, first it needs to add devices. For example, various devices in the home network are added to the smart network and recorded in the cloud server.

(1) Adding Devices

When adding devices, the cloud needs to record device IDs of the devices. For example, in this embodiment, it is assumed that door magnetism's device ID is ID_1, lamp's device ID is ID_2, infrared detector's device ID is ID_3, water fountain's device ID is ID_4 and electric kettle's device ID is ID_5.

In addition to recording device IDs of respective devices, meanwhile, the server also records device attributes of respective devices. Attributes are uniquely coded by the cloud, and may be divided into function attributes, location attributes, text attributes, etc.

Function codes are defined by the cloud, device manufacturers declare their function codes when implementing device function programs, the lacked codes are requested to the cloud.

Specifically, as shown in Table I below, functions of respective devices may be defined as follows, and function codes may be assigned for each attribute.

TABLE I

| Door magnetism | Monitoring Open/Close of door, monitoring Open/Close of window etc. |
|---|---|
| Lamp | Switching, brightness adjusting etc. |
| Infrared detector | Monitoring whether there is someone etc. |
| Water fountain | Heating water, cooling water etc. |
| Electric kettle | Heating water |

In addition, the location attributes are specified by the user when adding the devices, such as bedroom, living room, kitchen, etc. These attributes are reported to the cloud server when adding the devices, and bound with the device IDs. For example, location attribute of the door magnetism may be bound as bedroom doorway, and location attribute of the lamp may be bound as bedroom.

It is also possible to specify the function attributes when adding the devices, such as for lamp, specifying bedside lamp, wall lamp, table lamp, etc., that is to say, different lamps have different function attributes. These attributes are reported to the cloud server when adding the devices, and bound with the device IDs.

It should be noted that when setting attributes, the user may drag device icons to scenario images to set the attributes in a more friendly way, thereby simplifying the setup process.

In addition, text attributes may be set by the user to describe functions, such as specifying a certain electric device to an outlet, like specifying the electric kettle to a kitchen-dedicated outlet. Outlet is indistinguishable functionally, thus text attributes may be added to describe an outlet to distinguish it, for example, an outlet for electric water bottle. Text attributes are also reported to the cloud server when adding devices, and bound with the device IDs.

(2) Setting Rules

After adding the respective devices, rules can be set.

In an embodiment, the user may for example add the devices by the client device 1 such as a smart phone, and set linkage rules applied on the hub at the location A, such as the device A triggers the device B.

In another embodiment, linkage rules applied on the hub at the location A may be set through analysis of large data at the cloud server. Specifically, for example, the cloud server can set linkage rules applied on the hub at the location A by analyzing a large amount of operation data of the device A and the device B. For example, the cloud server detects that the user performs the operation of turning on and turning off the bedside lamp 100 times after entering the bedroom, therefore, the cloud server may set such linkage rules: the door magnetism having device ID1 triggers the lamp having device ID2.

In addition, since the linkage rules are set by the user or determined based on user' behaviors, so that the linkage rules are user-based (e.g., user ID-based), that is, the linkage rules are based on a first user that sets the linkage rules.

Thereafter, the linkage rules may be transmitted to the server 2. The server 2 can abstract that one device having certain attributes triggers another device having certain attributes after receiving the linkage rules.

For example, as for one piece of device-based linkage rule set by the user via the client:

door magnetism having device ID_1 detecting an open→lamp having device ID_2 lightening The cloud server records this piece of rule, meanwhile extracts an attribute device rule:

bedroom, detecting door, door magnetism, detecting an open→bedroom, capable of being turned On/Off, bedside, lamp, lightening That is to say, the cloud server sets an abstract linkage rule:

bedroom, detecting door, door magnetism, detecting an open→bedroom, capable of being turned On/Off, bedside, lamp, lightening Such abstract linkage rule is not associated with a specific device ID, i.e., not limited to that the door magnetism having the specific device ID_1 triggers a device having the specific device IC_2 etc. Instead, the door magnetism having the above attributes can trigger the lamp having the above attributes.

(3) Adapting Rules

When the user comes to a new environment, for example, the user goes to a hotel or another settlement, when the user's client 1 is bounded with a new hub (hub at a location B), the abstract attribute device rule under the user ID associated with the user can be adapted to respective devices under the new hub, so that in the new environment the user can continue to obtain using experience same as that in the original environment.

Specifically, the server transmits the attribute device rule to the hub at the location B, the hub at the location B can generate specific linkage rules with respect to device IDs of respective sub-devices at the location B. For example, it is assumed that at the location B there is a door magnetism whose ID is ID_3 and a lamp whose ID is ID_4, the generated linkage rule is as follows:

door magnetism having device ID_3 detecting an open lamp having the device ID_4 lightening (4) Implementing Rules After the hub at the location B generates the specific linkage rules that adapt to the local devices, the respective sub-devices may be controlled to execute the specific linkage rules. For example, when the user enters the hotel, the door magnetism detects the user's entry, it automatically triggers the lamp to turn on.

First Embodiment

Next, the information processing method according to the first embodiment of the present disclosure will be described in detail with reference to FIG. 2.

Figure 2:
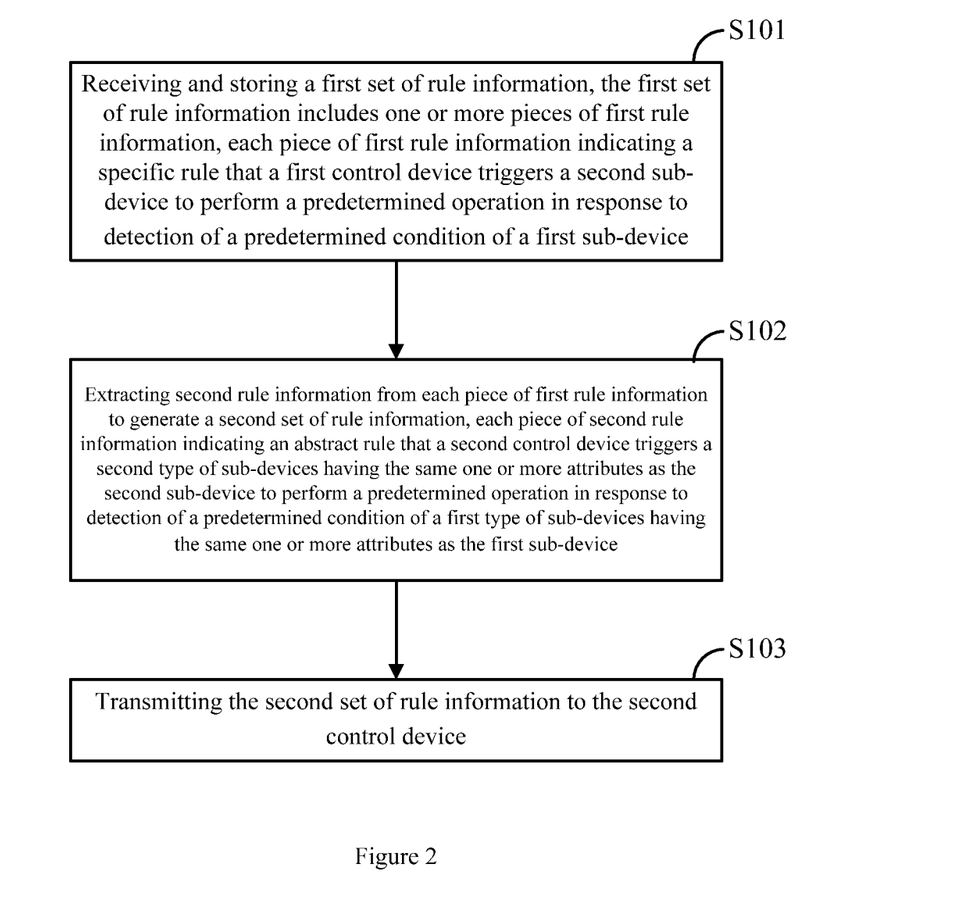
FIG. 2 is a flowchart of the information processing method according to the first embodiment of present disclosure.

As shown in FIG. 2, the information processing method according to the first embodiment of the present disclosure is applied to an electronic device, in this embodiment, the information processing method may be applied to a server.

The method 100 comprises:

step S101: receiving and storing a first set of rule information, the first set of rule information includes one piece or more pieces of first rule information, each piece of first rule information indicating a specific rule that a first control device triggers a second sub-device to perform a predetermined operation in response to detection of a predetermined condition of a first sub-device;

step S102: extracting second rule information from each piece of first rule information to generate a second set of rule information, each piece of second rule information indicating an abstract rule that a second control device triggers a second type of sub-devices having the same one or more attributes as the second sub-device to perform a predetermined operation in response to detection of a predetermined condition of a first type of sub-devices having the same one or more attributes as the first sub-device; and step S103: transmitting the second set of rule information to the second control device.

Specifically, in step S101, the server may for example receive and store the first set of rule information from the client or the hub at the location A, the first set of rule information includes one piece or more pieces of first rule information, each piece of the first rule information indicates that a specific rule that a first control device triggers a second sub-device to perform a predetermined operation in response to detection of a predetermined condition of a first sub-device. That is to say, one piece or more pieces of first rule information may be set in advance, this first rule information is the specific linkage rules described above. The first set of rule information may be transmitted from the client or the hub at the location A to the server.

Then, in step S102, the server extracts second rule information from each piece of first rule information to generate a second set of rule information, each piece of second rule information indicates an abstract rule that a second control device triggers a second type of sub-devices having the same one or more attributes as the second sub-device to perform a predetermined operation in response to detection of a predetermined condition of a first type of sub-devices having the same one or more attributes as the first sub-device.

As described above, the server abstracts an abstract device rule not with regard to a specific device ID from the specific rule information with respect to the specific device ID, the abstract device rule indicates a rule that a second control device triggers a second type of sub-devices having the same one or more attributes as the second sub-device to perform a predetermined operation in response to detection of a predetermined condition of a first type of sub-devices having the same one or more attributes as the first sub-device.

Then, in step S103, the server may transmit the second set of rule information to the second control device.

As described above with reference to FIG. 1, the second control device (the hub at the location B) can generate a third set of rule information according to the second set of rule information, the third set of rule information indicates a specific rule that a first control device triggers a fourth sub-device having the same one or more attributes as the second sub-device to perform a predetermined operation in response to detection of a predetermined condition of a third sub-device having the same one or more attributes as the first sub-device.

In other words, the hub at the location B can, according to a specific circumstance of local devices, restore that the third sub-device having the specific device ID triggers the fourth sub-device having the specific device ID from the abstract device rule.

In the server, extracting second rule information from each piece of first rule information by the server to generate a second set of rule information further comprises:

acquiring first attribute information of the first sub-device and second attribute information of the second sub-device according to each piece of first rule information. As described above with reference to FIG. 1, the first attribute information of the first sub-device (the door magnetism) can be acquired: bedroom, detecting door, door magnetism, detecting an open. And the second attribute information of the second sub-device (lamp) can be acquired: bedroom, capable of being turned On/Off, bedside, lamp, lightening.

Then, associating the first attribute information and the second attribute information to generate second rule information. That is to say, the above "bedroom, detecting door, door magnetism, detecting an open" and "bedroom, capable of being turned On/Off, bedside, lamp, lightening" are associated, so that they become an abstract device attribute rule.

Next, merging all generated second rule information to generate the second set of rule information.

In an embodiment, the first set of rule information is associated with first user identification when being created, and the second set of rule information is associated with the same first user identification.

Specifically, as described above with reference to FIG. 1, when the first user creates the specific first set of rule information using the client, the first set of rule information is associated with the first user identification (user ID). That is to say, the first set of rule information is based on the first user.

When such first set of rule information is transmitted to the server, and the server extracts the second set of rule information based on the first set of rule information, the second set of rule information certainly is also associated with the same first user identification (user ID).

Then, the server may, in response to a request from the second control device, transmit the second set of rule information to the second control device, wherein the request is sent by the second control device when acquiring the first user identification.

For example, when the user comes to the hotel, he/she can connect the hotel's hub via his/her smart phone. When acquiring the user's first user identification (user ID) (for example, when detecting that the user connects via the smart phone), the hotel's hub may request the server to transmit the second set of rule information (i.e., abstract device attribute information) to the user (user ID).

In an embodiment, when the third sub-device is same as the first sub-device and the fourth sub-device is same as the second sub-device, the second control device can generate the third set of rule information according to the second set of rule information.

For example, when the hotel is also provided a door magnetism and a bedside lamp, an linkage rule that the door magnetism triggers the bedside lamp can be generated directly. That is, the door magnetism having device ID_3 triggers the lamp having device ID_4.

In another embodiment, when the third sub-device has one or more attributes same as the second sub-device and the fourth sub-device has one or more attributes same as the second sub-device, the second control device can generate the third set of rule information according to the second set of rule information.

For example, when the hotel is also provided with a door magnetism and a table lamp, not a bedside lamp, the server searches an upper stage of the attribute, for example, "bedroom, capable of being turned On/Off, lamp", and detects that there is a table lamp, then it make a transmission to the second control device, the second control device may generate a rule that the door magnetism having device ID_3 triggers the table lamp having device ID_4.

In another embodiment, when a plurality of third sub-devices have the same one or more attributes as the first sub-device and a plurality of fourth sub-devices have the same one or more attributes as the second sub-device, as for one selected third sub-device and one selected fourth sub-device, the second control device can generate the third set of rule information according to the second set of rule information.

For example, when the hotel is provided a door magnetism and two bedside lamps (having device ID_4 and ID_5), the user may select one bedside lamp (having device ID_4) to generate an linkage rule that the door magnetism triggers the bedside lamp. That is, the door magnetism having device ID_3 triggers the lamp having device ID_4.

Therefore, the information processing method according to the first embodiment of the present disclosure enables the user to apply set rules to different control devices, thereby improving user experience.

Second Embodiment

Next, the information processing method according to the second embodiment of the present disclosure will be described in detail with reference to FIG. 3.

Figure 3:
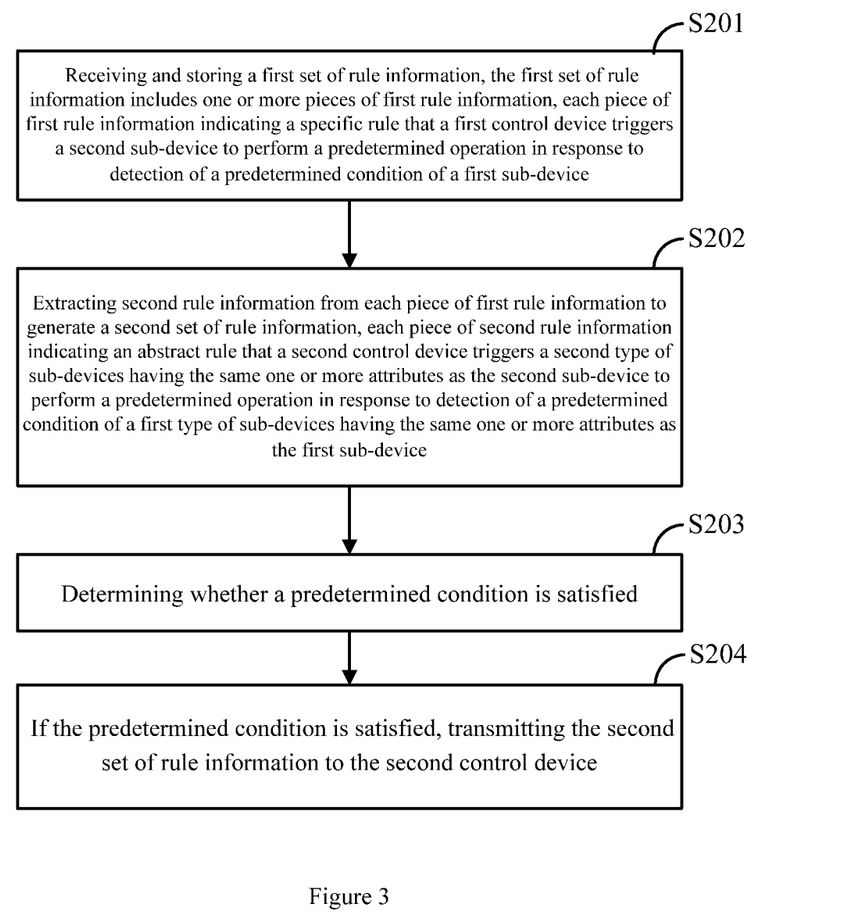
FIG. 3 is a flowchart of an information processing method according to a second embodiment of present disclosure.

As shown in FIG. 3, the information processing method according to the second embodiment of the present disclosure is applied to an electronic device, in this embodiment, the information processing method may be applied to a server.

The method 200 comprises:

step S201: receiving and storing a first set of rule information, the first set of rule information includes one piece or more pieces of first rule information, each piece of first rule information indicating a specific rule that a first control device triggers a second sub-device to perform a predetermined operation in response to detection of a predetermined condition of a first sub-device;

step S202: extracting second rule information from each piece of first rule information to generate a second set of rule information, each piece of second rule information indicating an abstract rule that a second control device triggers a second type of sub-devices having the same one or more attributes as the second sub-device to perform a predetermined operation in response to detection of a predetermined condition of a first type of sub-devices having the same one or more attributes as the first sub-device; and step S203: determining whether a predetermined condition is satisfied;

step S204: if the predetermined condition is satisfied, transmitting the second set of rule information to the second control device.

Specifically, steps S201 and step S202 the essentially same as steps S101 and S102 in the first embodiment, detailed explanations for them are omitted.

Steps S203 and S204 different from the first embodiment will be mainly described below.

Specifically, in the information processing method according to the second embodiment, in step S203, whether a predetermined condition is satisfied is determined before transmitting the second set of rule information to the second control device.

That is to say, in many cases, it needs to determine whether a specific linkage rule is adapted to transfer. For example, the linkage rule that the door magnetism triggers the lamp can be transferred between home and hotel, but not suitable for transfer between home and workplace.

For this reason, determination may be made first to determine whether a predetermined condition is satisfied before transmitting the second set of rule information to the second control device.

Specifically, as described above, the first set of rule information has the rule attribute information, and the second control device has the control attribute information. Thus, in step S203, determining whether a predetermined condition is satisfied may comprise:

when the control attribute information of the second control device matches the rule attribute information of the first set of rule information, determining that the predetermined condition is satisfied.

That is to say, in step S203, it is possible to first determine whether the control attribute information of the second control device matches the rule attribute information of the first set of rule information.

For example, the control attribute information in the hub of the hotel indicates that the hub is located in the hotel, and includes a door magnetism and a lamp, the door magnetism is adaptive to trigger the lamp. Therefore, the rule attribute information that the door magnetism triggers the lamp applies.

On the other hand, the attribute information in the hub in the workplace indicates that the hub is located in the workplace, but the door magnetism is not adaptive to trigger the lamp. Therefore, the rule attribute information that the door magnetism triggers the lamp does not apply.

Likewise, the same control attribute information may be also set for the other respective sub-devices, so that the server transmits a portion of or all the first rule information in the first set of rule information that the rule attribute information matches the control attribute information of the second control device to the second control device.

Therefore, the information processing method according to the second embodiment of the present disclosure enables the user to apply set rules to control devices in different environments, thereby improving user experience.

Third Embodiment

Next, the information processing method according to the third embodiment of the present disclosure will be described in detail with reference to FIG. 4.

Figure 4:
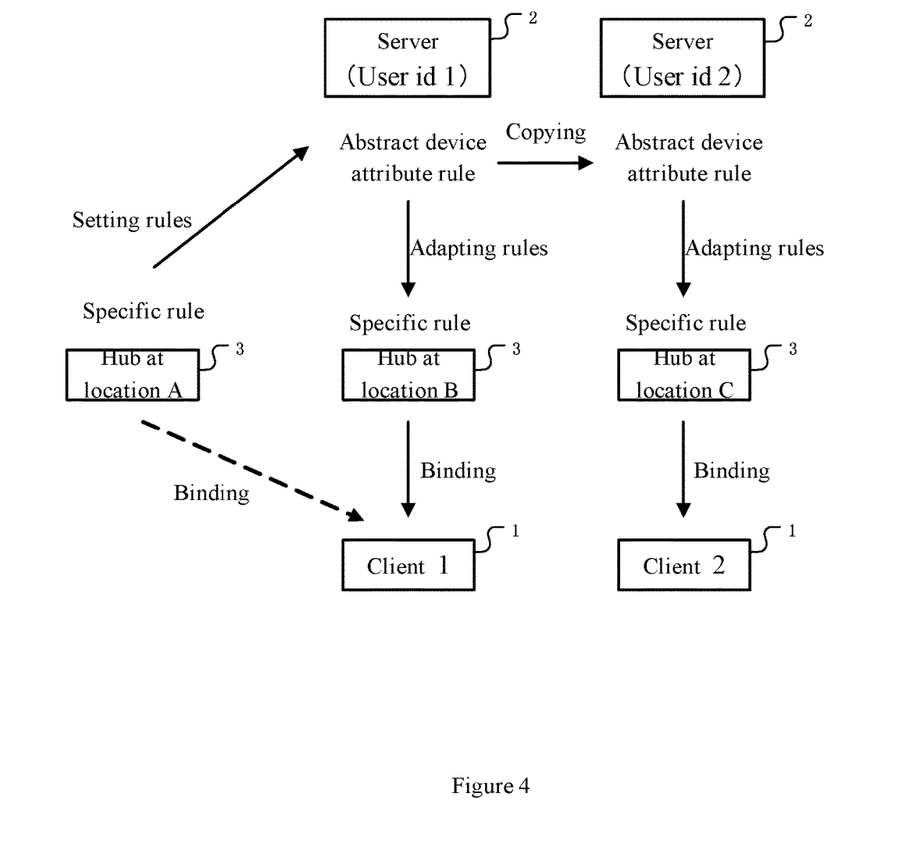
FIG. 4 is a schematic diagram of an information processing method according to a third embodiment of present disclosure.

As shown in FIG. 4, the left half of FIG. 4 is same as that of FIG. 1, that is, rules are set based on the ID of the first user. The right half of FIG. 4 illustrates that the set rules can be copied to a second user to be used.

For example, some common rules, for example, the door magnetism triggers the bedside lamp, can be copied to the second user, to improve user experience of the second user.

Specifically, since the first set of rule information is created by the first user, so the first set of rule information is associated with the first user identification when being created, and the second set of rule information is associated with the same first user identification.

The second user can copy the first set of rule information of the first user, and then apply the first set of rule information. For example, the second user can transfer the first set of rule information to a hub 3 at a location C, and control respective sub-devices to operate in linkage via the hub 3 at the location C.

After the second user copies the first set of rule information of the first user, the acquired first set of rule information will be associated with the user ID of the second user.

Thus, after a client device 1 of the second user is connected to the second control device, in response to a request from the second control device, the server 2 can transmit the second set of rule information to the second control device, wherein the request is sent by the second control device when obtaining second user identification, the first set of rule information is associated with the second user identification after being created according to a predetermined operation.

Specifically, for example, after the second user arrives at the hotel, the second user can connect the hotel's hub via his/her smart phone. When the hotel's hub acquires the second user identification (user ID 2) of the user (such as detecting that the user connects via his/her smart phone), it may request the server to transmit the set of rule information for the user (user ID2), the second set of rule information may be obtained by copying from the first user.

For example, when the hotel is also provided with the door magnetism and the bedside lamp, the linkage rule that the door magnetism triggers the bedside lamp may be generated directly. That is, the door magnetism having device ID_3 triggers the lamp having device ID_4.

Therefore, the information processing method according to the third embodiment of the present disclosure enables the user to apply set rules to control devices in different environments, thereby improving user experience.

Fourth Embodiment

Next, the electronic device according to the fourth embodiment of the present disclosure will be described in detail with reference to FIG. 5.

Figure 5:
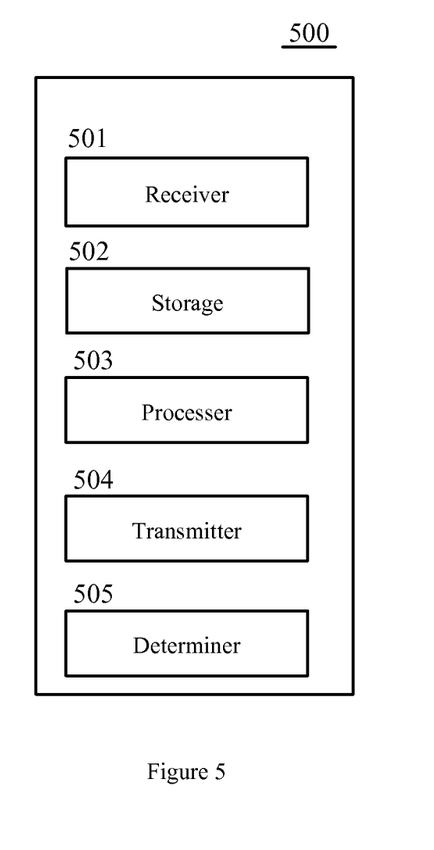
FIG. 5 is a block diagram of functional configuration of an electronic device according to a fourth embodiment of the present disclosure.

As shown in FIG. 5, the electronic device 500 according to this embodiment of the present disclosure comprises:

a receiver 501 configured to receive a first set of rule information, the first set of rule information includes one piece or more pieces of first rule information, each piece of first rule information indicating a specific rule that a first control device triggers a second sub-device to perform a predetermined operation in response to detection of a predetermined condition of a first sub-device;

a storage 502 configured to store a first set of rule information;

a processor 503 configured to extract second rule information from each piece of first rule information to generate a second set of rule information, each piece of second rule information indicating an abstract rule that a second control device triggers a second type of sub-devices having the same one or more attributes as the second sub-device to perform a predetermined operation in response to detection of a predetermined condition of a first type of sub-devices having the same one or more attributes as the first sub-device; and a transmitter 504 configured to transmit the second set of rule information to the second control device.

Preferably, the second control device can generate a third set of rule information according to the second set of rule information, the third set of rule information indicating a specific rule that a first control device triggers a fourth sub-device having the same one or more attributes as the second sub-device to perform a predetermined operation in response to detection of a predetermined condition of a third sub-device having the same one or more attributes as the first sub-device.

Preferably, the processor 503 is further configured to:

acquire first attribute information of the first sub-device and second attribute information of the second sub-device according to each piece of first rule information;

associate the first attribute information and the second attribute information to generate second rule information; and merge all generated second rule information to generate the second set of rule information.

Preferably, the first set of rule information is associated with first user identification when being created, and the second set of rule information is associated with the same first user identification, the transmitter 504 is further configured to:

in response to a request from the second control device, transmit the second set of rule information to the second control device, the request being sent by the second control device when acquiring the first user identification.

Preferably, the electronic device further comprises:

a determiner 505 configured to determine whether a predetermined condition is satisfied, before transmitting the second set of rule information to the second control device;

if the predetermined condition is satisfied, the transmitter transmits the second set of rule information to the second control device. Specifically, since the first set of rule information is created by the first user, so the first set of rule information is associated with the first user identification when being created, and the second set of rule information is associated with the same first user identification.

Preferably, the first set of rule information has rule attribute information, and the second control device has control attribute information, the determiner 505 is further configured to:

when the control attribute information of the second control device matches the rule attribute information of the first set of rule information, determine that the predetermined condition is satisfied.

Preferably, the transmitter 504 is further configured to:

transmit a portion of or all the first rule information in the first set of rule information that the rule attribute information matches the control attribute information of the second control device to the second control device.

Preferably, when the third sub-device is same as the first sub-device and the fourth sub-device is same as the second sub-device, the second control device can generate the third set of rule information according to the second set of rule information.

Preferably, when the third sub-device has the same one or more attributes as the second sub-device and the fourth sub-device has the same one or more attributes as the second sub-device, the second control device can generate the third set of rule information according to the second set of rule information.

Preferably, when a plurality of third sub-devices have the same one or more attributes as the first sub-device and a plurality of fourth sub-devices have the same one or more attributes as the second sub-device, as for one selected third sub-device and one selected fourth sub-device, the second control device can generate the third set of rule information according to the second set of rule information.

Preferably, the first set of rule information is associated with first user identification when being created, and the second set of rule information is associated with the same first user identification, the transmitter 504 is further configured to:

in response to a request from the second control device, transmit the second set of rule information to the second control device, the request being sent by the second control device when obtaining second user identification, the first set of rule information being associated with the second user identification after being created according to a predetermined operation.

Therefore, the information processing method according to the fourth embodiment of the present disclosure enables the user to apply set rules to control devices in different environments, thereby improving user experience.

It is reminded to note that the above embodiments are only examples, the present disclosure is not limited to these examples, various variations may be made.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically Through the above description of the implementations, those skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for those with ordinary skill in the art, modifications may be made to the specific implementations and applications depending on the concepts of the present disclosure. To sum up, contents of this specification should not be construed as limiting the present disclosure.

The invention claimed is:

1. A method for controlling devices comprising:
    receiving and storing a first set of rule information, the first set of rule information including one piece or more pieces of first rule information, each piece of first rule information indicating a specific rule that a first control device triggers a second device to perform a predetermined operation in response to detection of a predetermined condition of a first device;
    extracting second rule information from each piece of first rule information to generate a second set of rule information, each piece of second rule information indicating an abstract rule that a second control device triggers a second type of devices having the same one or more attributes as the second device to perform a predetermined operation in response to detection of a predetermined condition of a first type of devices having the same one or more attributes as the first device, wherein the one or more attributes comprise function attributes;
    transmitting the second set of rule information to the second control device; and
    controlling, by the second control device, at least one of the second type of devices to perform the predetermined operation based on the second set of rule information.

2. The method of claim 1, wherein the second control device can generate a third set of rule information according to the second set of rule information, the third set of rule information indicating a specific rule that the first control device triggers a fourth device having the same one or more attributes as the second device to perform a predetermined operation in response to detection of a predetermined condition of a third device having the same one or more attributes as the first device.

3. The method of claim 2, wherein when the third device is same as the first device and the fourth device is same as the second device, the second control device can generate the third set of rule information according to the second set of rule information; or
    when the third device has the same one or more attributes as the second device and the fourth device has the same one or more attributes as the second device, the second control device can generate the third set of rule information according to the second set of rule information; or
    when a plurality of third devices have the same one or more attributes as the first device and a plurality of fourth devices have the same one or more attributes as the second device, as for one selected third device and one selected fourth device, the second control device can generate the third set of rule information according to the second set of rule information.

4. The method of claim 1, wherein extracting second rule information from each piece of first rule information to generate the second set of rule information further comprises:
    acquiring first attribute information of the first device and second attribute information of the second device according to each piece of first rule information;
    associating the first attribute information and the second attribute information to generate second rule information; and
    merging all generated second rule information to generate the second set of rule information.

5. The method of claim 1, wherein the first set of rule information is associated with first user identification when being created, and the second set of rule information is associated with the same first user identification, and transmitting the second set of rule information to the second control device further comprises, in response to a request from the second control device, transmitting the second set of rule information to the second control device, the request being sent by the second control device when acquiring the first user identification.

6. The method as claimed in claim 1, further comprising:
    determining whether a predetermined condition is satisfied, before transmitting the second set of rule information to the second control device;
    if the predetermined condition is satisfied, transmitting the second set of rule information to the second control device.

7. The method as claimed in claim 6, wherein the first set of rule information has rule attribute information, and the second control device has control attribute information, and determining whether a predetermined condition is satisfied comprises when the control attribute information of the second control device matches the rule attribute information of the first set of rule information, determining that the predetermined condition is satisfied.

8. The method of claim 7, wherein transmitting the second set of rule information to the second control device further comprises transmitting a portion of or all the first rule information in the first set of rule information that the rule attribute information matches the control attribute information of the second control device to the second control device.

9. The method of claim 1, wherein the first set of rule information is associated with first user identification when being created, and the second set of rule information is associated with the same first user identification, and transmitting the second set of rule information to the second control device further comprises in response to a request from the second control device, transmitting the second set of rule information to the second control device, the request being sent by the second control device when obtaining second user identification, the first set of rule information being associated with the second user identification after being created according to a predetermined operation.

10. An electronic device, comprising:
a receiver configured to receive a first set of rule information, the first set of rule information including one piece or more pieces of first rule information, each piece of first rule information indicating a specific rule that a first control device triggers a second device to perform a predetermined operation in response to detection of a predetermined condition of a first device;
a storage configured to store the received first set of rule information;
a processor configured to extract second rule information from each piece of first rule information to generate a second set of rule information, each piece of second rule information indicating an abstract rule that a second control device triggers a second type of devices having the same one or more attributes as the second device to perform a predetermined operation in response to detection of a predetermined condition of a first type of devices having the same one or more attributes as the first device, wherein the one or more attributes comprise function attributes;
a transmitter configured to transmit the second set of rule information to the second control device, wherein the second control device controls at least one of the second type of devices to perform the predetermined operation based on the second set of rule information.

11. The electronic device of claim 10, wherein the second control device can generate a third set of rule information according to the second set of rule information, the third set of rule information indicating a specific rule that a first control device triggers a fourth device having the same one or more attributes as the second device to perform a predetermined operation in response to detection of a predetermined condition of a third device having the same one or more attributes as the first device.

12. The electronic device of claim 11, wherein
when the third device is same as the first device and the fourth device is same as the second device, the second control device can generate the third set of rule information according to the second set of rule information; or
when the third device has the same one or more attributes as the second device and the fourth device has the same one or more attributes as the second device, the second control device can generate the third set of rule information according to the second set of rule information; or
when a plurality of third devices have the same one or more attributes as the first device and a plurality of fourth devices have the same one or more attributes as the second device, as for one selected third device and one selected fourth device, the second control device can generate the third set of rule information according to the second set of rule information.

13. The electronic device of claim 10, wherein the processor is further configured to:
acquire first attribute information of the first device and second attribute information of the second device according to each piece of first rule information associate the first attribute information and the second attribute information to generate second rule information; and
merge all generated second rule information to generate the second set of rule information.

14. The electronic device of 10, wherein the first set of rule information is associated with first user identification when being created, and the second set of rule information is associated with the same first user identification, and the transmitter is further configured to, in response to a request from the second control device, transmit the second set of rule information to the second control device, the request being sent by the second control device when acquiring the first user identification.

15. The electronic device as claimed in claim 10, further comprising a determining unit configured to determine whether a predetermined condition is satisfied, before transmitting the second set of rule information to the second control device and if the predetermined condition is satisfied, the transmitter transmits the second set of rule information to the second control device.

16. The electronic device of claim 15, wherein the first set of rule information has rule attribute information, and the second control device has control attribute information, and the determining unit is further configured to, when the control attribute information of the second control device matches the rule attribute information of the first set of rule information, determine that the predetermined condition is satisfied.

17. The electronic device of claim 16, wherein the transmitter is further configured to transmit a portion of or all the first rule information in the first set of rule information that the rule attribute information matches the control attribute information of the second control device to the second control device.

18. The electronic device as claimed in claim 10, wherein the first set of rule information is associated with first user identification when being created, and the second set of rule information is associated with the same first user identification, and the transmitter is further configured to, in response to a request from the second control device, transmit the second set of rule information to the second control device, the request being sent by the second control device when obtaining second user identification, the first set of rule information being associated with the second user identification after being created according to a predetermined operation.

* * * * *